US010722919B2

(12) United States Patent
Beach et al.

(10) Patent No.: US 10,722,919 B2
(45) Date of Patent: Jul. 28, 2020

(54) SPOIL TREATMENT PLANT

(71) Applicant: VHS IP PTY LTD, Ormeau, Queensland (AU)

(72) Inventors: Jack Beach, Yatala (AU); Neil Costello, Yatala (AU)

(73) Assignee: VHS IP PTY LTD, Ormeau, Queensland (AU)

( * ) Notice: Subject to any disclaimer, the term of this patent is extended or adjusted under 35 U.S.C. 154(b) by 0 days.

(21) Appl. No.: 15/753,088

(22) PCT Filed: Aug. 19, 2016

(86) PCT No.: PCT/AU2016/050767
§ 371 (c)(1),
(2) Date: Feb. 15, 2018

(87) PCT Pub. No.: WO2017/027930
PCT Pub. Date: Feb. 23, 2017

(65) Prior Publication Data
US 2018/0200759 A1    Jul. 19, 2018

(30) Foreign Application Priority Data
Aug. 20, 2015   (AU) .............................. 2015903377

(51) Int. Cl.
*B07B 1/00*   (2006.01)
*B07B 13/16*  (2006.01)
(Continued)

(52) U.S. Cl.
CPC .......... *B07B 1/005* (2013.01); *B01D 21/2455* (2013.01); *B01D 37/03* (2013.01);
(Continued)

(58) Field of Classification Search
None
See application file for complete search history.

(56) References Cited

U.S. PATENT DOCUMENTS 2,310,009 A * 2/1943 Dedrick ................ C02F 1/5236
                                                        210/199
2,817,440 A * 12/1957 Casner .................. E21B 21/065
                                                         209/208
(Continued)

FOREIGN PATENT DOCUMENTS

CN    202688158    1/2013
CN    104710088    6/2015
(Continued)

OTHER PUBLICATIONS

IPER of PCT/AU2016/050767; 4 pages; dated Dec. 13, 2017.*
International Search Report and Written Opinion for PCT application No. PCT/AU2016/050767 dated Nov. 22, 2016, 10 pages.

*Primary Examiner* — Robert J Popovics
(74) *Attorney, Agent, or Firm* — Myers Bigel, P.A.

(57) ABSTRACT

A spoil treatment plant configured within a frame for easy relocation. The spoil treatment plant comprises a dump bin held within the frame for receiving spoil, a vibrating screen separator mounted in the frame away from the dump bin, an elevator located within the frame, the elevator transporting spoil from the dump bin to the vibrating screen separator, a slurry tank within the frame below the vibrating screen separator that collects slurry; and a chute adjacent the vibrating screen separator that delivers spadeable fill. The vibrating screen separator separates the spoil into spadeable fill delivered from the chute and fine slurry delivered to the slurry tank. The spoil treatment plant may also comprise a further dewatering element, such as a rotary press, that extracts water from the spadeable fill.

13 Claims, 7 Drawing Sheets

(51) Int. Cl.
  B01D 21/24 (2006.01)
  B01D 37/03 (2006.01)
  B05B 1/06 (2006.01)
  C02F 11/127 (2019.01)
  B01D 21/00 (2006.01)

(52) U.S. Cl.
  CPC ............... B05B 1/06 (2013.01); B07B 13/16 (2013.01); C02F 11/127 (2013.01); B01D 21/0021 (2013.01); B01D 21/2477 (2013.01); B07B 2230/01 (2013.01)

(56) References Cited

U.S. PATENT DOCUMENTS

| | | | | |
|---|---|---|---|---|
| 3,885,331 A * | 5/1975 | Mathieu | .................. | E02F 5/287 |
| | | | | 114/151 |
| 3,964,184 A * | 6/1976 | Mathieu | .................. | E02F 5/287 |
| | | | | 114/151 |
| 4,052,299 A * | 10/1977 | Rohr | .................. | B03B 5/00 |
| | | | | 209/155 |
| 4,495,065 A * | 1/1985 | Dereamer | .................. | B01D 35/20 |
| | | | | 209/243 |
| 5,020,858 A * | 6/1991 | Nishikawa | .................. | E02F 3/88 |
| | | | | 299/8 |
| 5,193,935 A * | 3/1993 | Musil | .................. | B09C 1/06 |
| | | | | 405/128.9 |
| 5,387,056 A * | 2/1995 | DeLuca | .................. | B09C 1/02 |
| | | | | 405/128.45 |
| 5,427,251 A * | 6/1995 | Landmann | .................. | B07B 1/12 |
| | | | | 198/498 |
| 5,575,921 A * | 11/1996 | Askin | .................. | C02F 11/123 |
| | | | | 210/710 |
| 5,614,094 A * | 3/1997 | Deister | .................. | B01D 33/015 |
| | | | | 210/388 |
| 5,938,936 A * | 8/1999 | Hodges | .................. | B01D 29/05 |
| | | | | 210/705 |
| 6,044,979 A * | 4/2000 | Rohr | .................. | B03B 5/00 |
| | | | | 209/430 |
| 6,059,120 A * | 5/2000 | Rohr | .................. | B03B 5/00 |
| | | | | 209/428 |
| 6,079,568 A * | 6/2000 | Loshe | .................. | B01D 33/0353 |
| | | | | 209/311 |
| 6,371,301 B1 * | 4/2002 | Schulte | .................. | B01D 33/033 |
| | | | | 209/405 |
| 6,395,187 B1 * | 5/2002 | Alanis | .................. | B01D 29/117 |
| | | | | 100/117 |
| 6,461,523 B1 * | 10/2002 | Greenrose | .................. | B01D 33/41 |
| | | | | 210/770 |
| 6,533,944 B1 * | 3/2003 | Rohr | .................. | B03B 9/00 |
| | | | | 209/428 |
| 7,198,156 B2 * | 4/2007 | Schulte | .................. | B01D 33/033 |
| | | | | 209/309 |
| 7,509,759 B2 * | 3/2009 | Langdon | .................. | B01D 21/00 |
| | | | | 37/307 |
| 7,514,011 B2 * | 4/2009 | Kulbeth | .................. | B01D 21/0045 |
| | | | | 175/206 |
| 7,523,570 B2 * | 4/2009 | Pobihushchy | .................. | E02F 3/8816 |
| | | | | 175/67 |
| 9,347,303 B2 * | 5/2016 | Horst | .................. | E21B 43/34 |
| 9,469,552 B2 * | 10/2016 | Horst | .................. | E21B 43/34 |
| 10,589,201 B2 * | 3/2020 | Larsson | .................. | B01D 33/803 |
| 2001/0042721 A1 | 11/2001 | Hodges et al. | | |
| 2006/0162195 A1 * | 7/2006 | Langdon | .................. | B01D 21/00 |
| | | | | 37/466 |
| 2007/0170099 A1 * | 7/2007 | Stolworthy | .................. | B03B 5/04 |
| | | | | 209/44 |
| 2007/0221555 A1 * | 9/2007 | Hodges | .................. | B01D 21/01 |
| | | | | 210/154 |
| 2012/0255916 A1 * | 10/2012 | Horst | .................. | E21B 43/34 |
| | | | | 210/774 |
| 2013/0075344 A1 * | 3/2013 | Wade | .................. | C02F 11/121 |
| | | | | 210/747.4 |
| 2015/0353404 A1 * | 12/2015 | Wade | .................. | C02F 11/121 |
| | | | | 53/111 R |
| 2019/0060794 A1 * | 2/2019 | Droke | .................. | B01D 19/00 |

FOREIGN PATENT DOCUMENTS

JP  H0290911  3/1990
KR  101365734  2/2014

* cited by examiner

SPOIL TREATMENT PLANT

FIELD OF THE INVENTION

The present invention relates to the general field of excavation and in particular to the problem of handling spoil, mainly slurries of dirt and water, produced during excavation. More particularly, the invention relates to a method and apparatus for reducing the volume of water in slurry.

BACKGROUND TO THE INVENTION

Non-destructive hydro-excavation or vacuum excavation techniques are widely accepted as the safest way to expose or excavate around underground services. In simple terms, a jet of water is blasted into soil to liquefy the soil and then the liquefied soil is sucked up using a vacuum truck. The process results in spoil that is mostly slurry that may be about 50:50 water and dirt. The slurry is waste and needs to be disposed of. In many countries and regions the slurry is considered to be contaminated and therefore there are limitations on how the disposal can be handled. In many cases the slurry must be transported to a suitable location for dumping. The suitable location is often a significant distance from the excavation site. This represents a significant cost in transport but also in lost productivity of the vacuum truck.

There is significant benefit if the amount of water in the spoil can be reduced. Firstly, the volume of material to be transported is reduced thus reducing the transport asset requirement. Secondly, the partly dry waste is easier to handle and less problematic for disposal.

At present the approach commonly used is to dump the spoil in a holding pond and allow slow dewatering by settling. The partly dry slurry is then re-handled to truck it to a permanent disposal site. This process is not available in many places as the water is considered to be contaminated and therefore cannot be allowed to run into the surrounding environment from a holding pond. Disposal issues associated with hydro-excavation are proving to be a negative impost on the rate of take up worldwide. Disposal of spoil is a significant time and cost issue.

The Inventors are aware of a number of devices that are used for dividing slurries or sludge into different fractions or for removing larger contaminants from sludge or slurries. For instance, Chinese patent application 104710088 describes a sludge treatment system that sieves sludge to remove large contaminants. It does not remove water or further improve the sludge for handling. Chinese patent application number 202688158 describes a system for treating oil sludge to remove large-size solid particles before an homogenization treatment. Korean patent number KR101365734 is similar to the two Chinese applications but aims to reduce moisture content by heating.

In many countries disposal of spoil requires a license, but fewer facilities are able to meet stringent requirements being imposed. Consequently, disposal facilities are:

Located further and further away from the CBD (City Centre);
Subject to government waste levies in some states and territories;
Becoming highly regulated and prohibitively expensive;
Operating under limited hours.
This has a number of implications including:
Increased Hydro-excavation costs;
Higher disposal costs;
Loss of productivity with increased off site time being paid for the disposal process;
Loss of production of our client's labour and equipment (time lost during
Hydro Vac unit off-site disposal).

There is a need for a solution that addresses at least some of these problems. In any event, there is benefit if the water can be removed from the spoil at or near the excavation site as this allows for reuse of the water, thus further reducing excavation costs. It is also useful if the Spoil Treatment Plant is easily relocatable so it can be positioned as close to the source of the spoil as practical.

SUMMARY OF THE INVENTION

In one form, although it need not be the only or indeed the broadest form, the invention resides in a spoil treatment plant for dewatering spoil comprising:
a frame;
a dump bin held within the frame for receiving spoil;
a vibrating screen separator mounted in the frame away from the dump bin;
an elevator located within the frame, the elevator transporting spoil from the dump bin to the vibrating screen separator;
a slurry tank within the frame below the vibrating screen separator that collects slurry; and
a chute adjacent the vibrating screen separator that delivers spadeable fill;
wherein the vibrating screen separator separates the spoil into spadeable fill delivered from the chute and fine slurry delivered to the slurry tank.

All the elements of the spoil treatment plant are contained within the frame so that the spoil treatment plant is easily relocatable. The frame is suitably of a size to easily fit onto a truck. The frame includes lifting or dragging points so that the entire plant can be lifted onto a flat top truck for easy relocation without disassembly.

Suitably the spoil treatment plant further comprises ramps for positioning a truck to dump spoil into the dump bin. The dump bin may comprise extended side walls that form a weir. The ramps are suitably of a size and shape to be stored within the frame during relocation.

Preferably the vibrating screen separator is driven by two motors acting to move a screen in opposite directions. The spoil treatment plant suitably includes a control box with controls to control the vibrating screen separator and the elevator.

The elevator is most suitably a screw elevator although a bucket elevator, belt conveyor, slurry pump or other device may also be suitable.

The vibrating screen separator suitably comprises a screen with apertures having a largest dimension of about 1 mm. The apertures preferably have an inverted cone profile to minimise fouling.

The vibrating screen separator may comprise two or more adjacent compartments for screening different material in each compartment. Each compartment of the vibrating screen separator may have a different screen.

Certain screens may be for coarse separation and other screens may be for fine separation. A coarse separation screen may have a largest dimension greater than 1 mm whereas a fine separation screen may have a largest dimension smaller than 1 mm.

The spoil treatment plant may further include a settling tank in which the slurry may separate into particulate matter and water by settling. The settling tank may not be within the frame.

The spoil treatment plant may further comprise one or more hydrocyclones that separate water from the slurry. The water may be re-used to wet the spoil on the vibrating screen separator.

The spoil treatment plant may comprise further dewatering elements that remove water from the fine slurry. One suitable dewatering element is a rotary press.

In another form, the invention resides in a process for dewatering spoil including the steps of:
delivering spoil to a dump bin of a spoil treatment plant;
transporting the spoil from the dump bin to a vibrating screen separator using an elevator, the vibrating screen separator separating the spoil into spadeable fill and fine slurry; and
removing water from the fine slurry for reuse.

The process may further include the steps of controlling the vibration of the vibrating screen separator.

The step of removing water from the fine slurry for reuse may involve using a rotary press to extract water.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
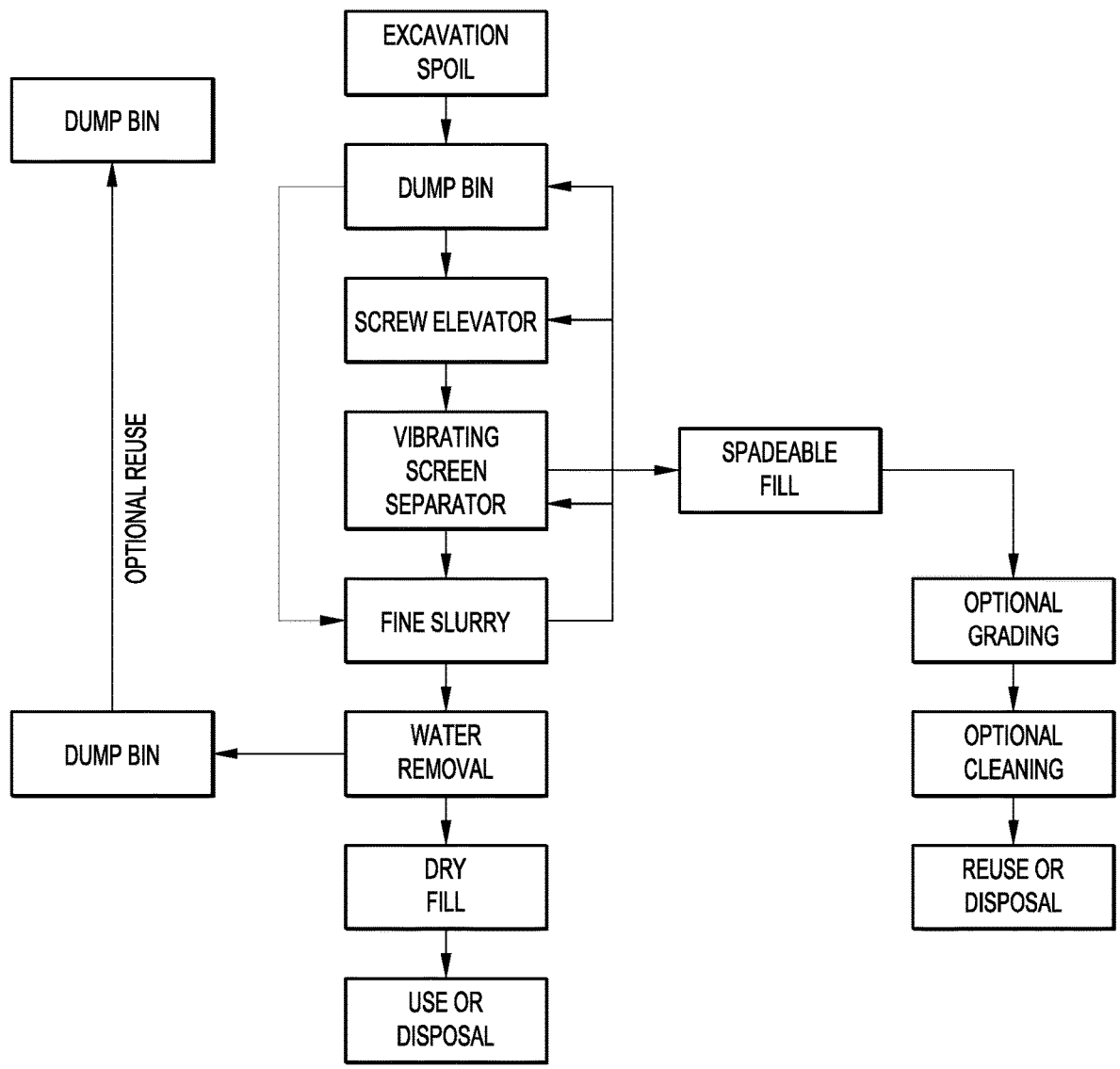
FIG. 1 is a flowchart of a spoil treatment process.

Embodiments of the present invention reside primarily in a spoil treatment plant and a process for dewatering spoil. Accordingly, the elements have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1 there is a shown a flowchart of a spoil treatment process. Spoil from an excavation site is delivered to a spoil treatment plant. The spoil may have been collected by a hydro-excavator, such as the units described above in which high pressure water is used to break up soil and a vacuum is used to suck the resultant slurry into a holding tank on a truck. The truck transports the spoil to the spoil treatment unit and dumps the spoil into a dump bin of the plant. Some of the water in the spoil may spill from the dump bin into a storage tank (slurry bin). This is described further below with reference to FIG. 8 and FIG. 9.

A screw elevator moves the spoil from the dump bin to a vibrating screen separator, described in greater detail below. The vibrating screen separator has a fine mesh screen that passes water and fine soil particles, which together form fine slurry. The fine slurry drops through the vibrating screen to a storage tank. Gravel or other screening aid may be introduced to the vibrating screen separator to promote aggregation of clay and improve the separation process. The screening aid may be introduced directly or may be added via the screw elevator.

The fine slurry may be pumped from the storage tank for use in the spoil treatment plant. For instance, it may be pumped onto the vibrating screen separator to assist the separation process. It may also be sprayed onto the screw elevator or used to wash out the excavator trucks, as described later by reference to FIG. 8 and FIG. 9.

The fine slurry may also be pumped to a settling tank to allow the soil particles to settle and clean water to be collected. Alternately, other techniques may be used for water removal such as flocculants and/or hydrocyclones. The removed water may be reused in the spoil treatment plant in the same manner as the fine slurry or may be stored for reuse elsewhere. For instance, the water may be returned to the truck for use in further hydro-excavation or may be used for unrelated applications such as irrigation.

The soil (dry fill) remaining after dewatering of the slurry is fine and may be used for agricultural applications or can be used as back-fill at the hydro-excavation site. The dry fill can also be sent for disposal if there are no other suitable uses or if there is some degree of contamination. Disposal of the dry fill is much easy than disposal of the unprocessed spoil because it does not include water and is a more homogeneous fraction.

The material that does not pass through the vibrating screen is exited from the unit through a chute. As a large amount of the water has been removed this fraction of the processed spoil will be easily spadeable. It may be transported to a disposal site or preferably it is further processed for other uses. For instance, it can be easily graded into a number of fractions based on size. It may also be cleaned to produce clean fill for back-fill at the hydro-excavation site or other sites requiring clean fill.

Figure 2:
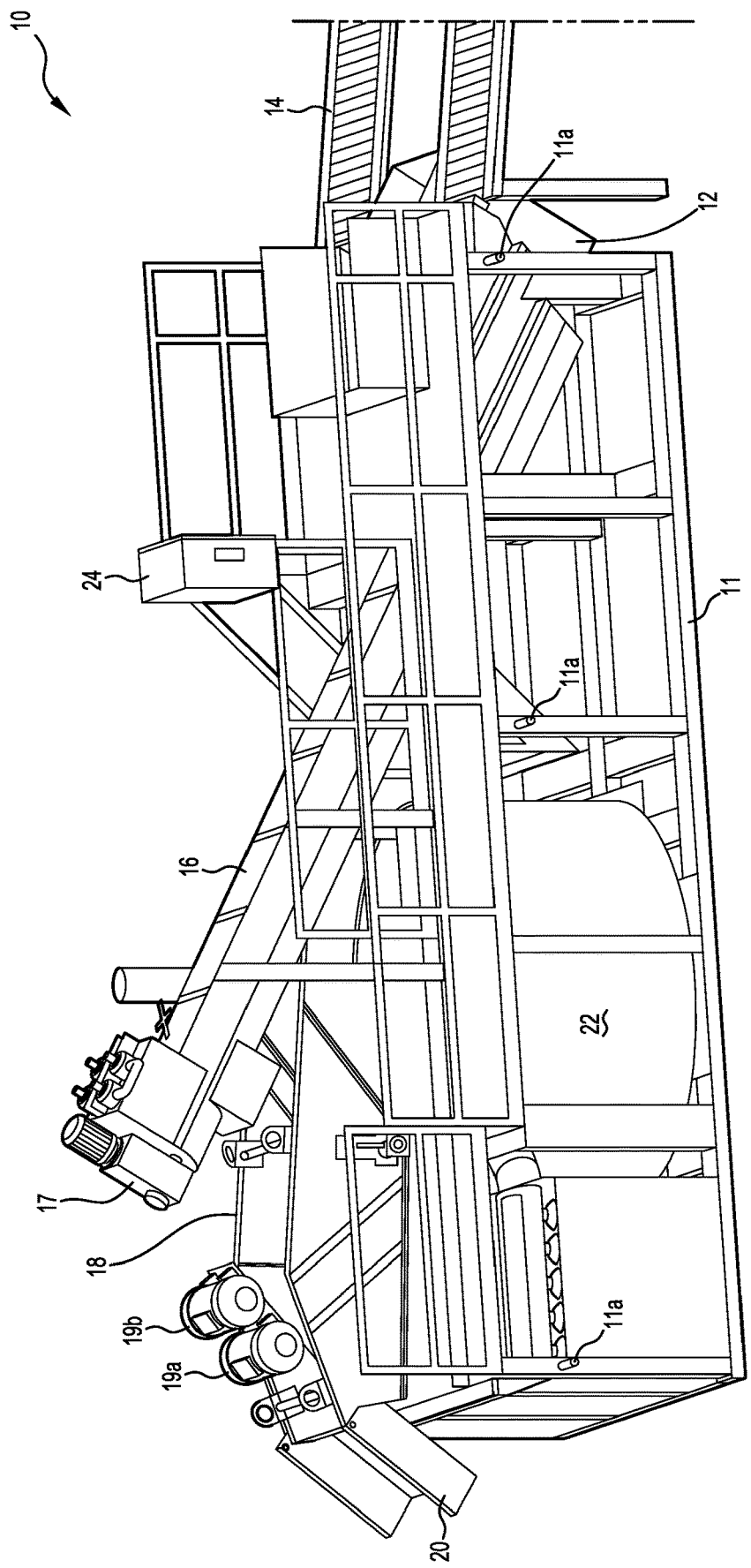
FIG. 2 is a sketch of the major components of a spoil treatment plant for working the process of FIG. 1.

Turning now to FIG. 2, there is shown a drawing of the main elements of a spoil treatment plant 10. The plant is constructed within a frame 11. The inventors envisage that the frame 11 includes lifting or dragging points 11a so that the entire plant 10 can be lifted onto a flat top truck for easy relocation without disassembly.

Spoil is delivered to the installation from, most likely, vacuum excavation trucks. The trucks dump the spoil into a dump bin 12. Ramps 14 may be provided to raise the truck to an appropriate height relative to the dump bin 12. Alternatively the spoil treatment plant 10 may be positioned on lower ground than the truck. The ramps 14 are designed to be placed onto the frame so they can be easily relocated with the plant 10.

An elevator, such as a screw elevator 16 transports spoil from the dump bin 12 to a vibrating screen separator 18. A screw elevator (sometimes referred to as a screw conveyor or auger conveyor) is a device that uses a rotating helical screw to move material. The screw elevator 16 is driven by a screw motor 17. One end of the screw elevator 16 is located at the lowest point in the dump bin 12. As the screw is rotated it moves material along the elevator until it is dropped on the vibrating screen separator 18. The screw motor 17 may be adjustable to vary the speed of rotation of the screw 16.

In alternate embodiment the elevator is a bucket elevator. A bucket elevator is a number of connected buckets that scoop up spoil and transport it to the vibrating screen separator 18. Other forms of elevator, such as a belt conveyor, may also be suitable.

The vibrating screen separator 18 is a fine screen separator that vibrates on one axis but is driven both forwards and backwards by a pair of motors 19a/19b. The motors 19 are adjustable so that the speed and amplitude of vibration may be changed independently for the forward and backward shift of the screen. The adjustable motors 19 allow for change in vibration intensity for different materials, although the inventors do not believe that this is essential. The screen is a steel mesh with apertures of approximately 1 mm largest dimension. The apertures have an inverted cone profile. That is to say, the aperture opens up on the underside. The inverted cone profile assists to reduce fouling or blockage of the apertures.

Spoil is dumped onto the screen and the vibration action moves the heavier fraction up the screen to a chute 20. The fine fraction, including water, falls through the screen to a slurry tank 22. The slurry tank 22 will contain fine slurry of small soil particles and water. All other material from the spoil exits the plant through the chute 20 as a spadeable fill. By spadeable fill it is meant that the water content has been sufficiently reduced that the fill can be easily lifted and carted.

A control box 24 is used to control the operation of the screw motor 17 and screen motors 19. As mentioned above, speed of the screw motor 17 and screen motors 19 may be adjustable. In this case the speeds are adjusted from the control box 24. The control box 24 also provides emergency shut off and other safety functions.

Figure 3:
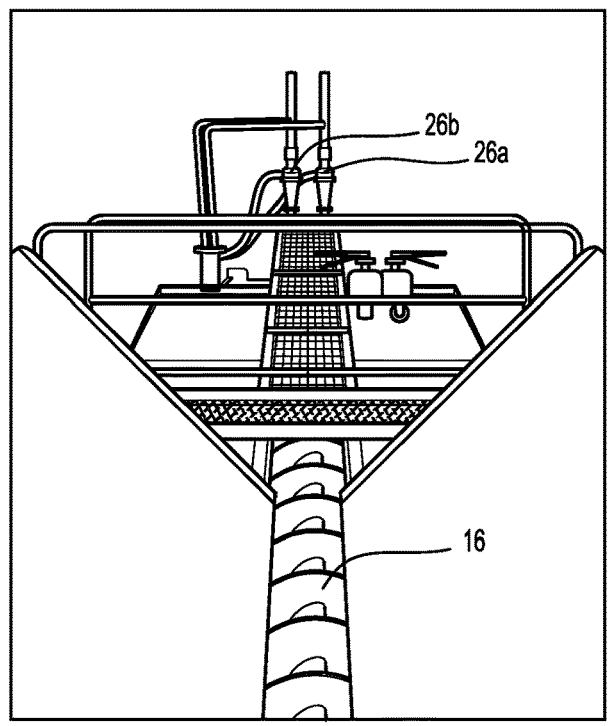
FIG. 3 is a view of part of another embodiment of a spoil treatment plant.
Figure 4:
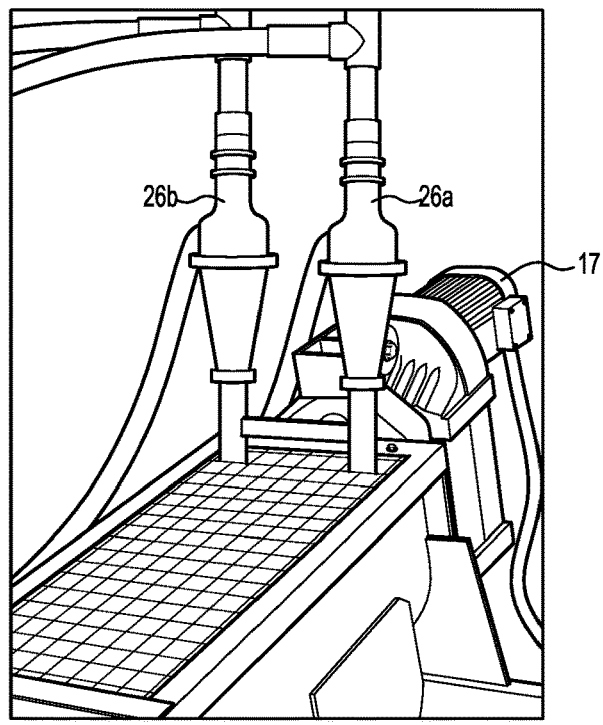
FIG. 4 is a close up view of hydrocyclones on the embodiment of FIG. 3.

In some cases the water from the slurry tank 22 may be reused to wet the spoil on the screen 18 to improve screening performance. In one embodiment, shown in FIG. 3 and FIG. 4, this can be done using hydrocyclones 26a/26b. Although two hydrocyclones are shown in the figures it will be appreciated that a single hydrocyclone could be used. Water is pumped from the slurry tank 22 to the hydrocyclones 26. Particles in the water are separated in the hydrocyclone so that relatively particle-free water is delivered to the vibrating screen separator 18.

Water from the slurry tank 22 may also be used for other applications. For instance, a flocculent may be added to precipitate particulate material held in suspension in the water in the slurry tank. The relatively clean water may then be siphoned from the tank and re-used for hydro-excavation. It may be that a flocculent is not required and merely allowing the particulate matter to settle in a settling tank is sufficient. In either case it will be convenient to pump the slurry from the slurry tank 22 to another tank (not shown) for further processing. Other possible treatments include filtration, sterilization (for example with ultraviolet light) or distillation.

The water need not be re-used in the spoil treatment plant 10 or in hydro-excavation. The water could be used in a completely different application, such as irrigation. This use is particularly relevant if the spadeable fill from the chute 20 is used for agricultural purposes. It has also been found that the water removed from the slurry is often rich in natural minerals and may therefore be very useful for irrigation.

The inventors estimate that 60-70% of the water used in hydro-excavation can be recovered in the spoil treatment plant.

As mentioned above, the spadeable fill from the vibrating screen separator can be used for multiple purposes. A primary purpose may be as back-fill at the hydro-excavation site. Another use may be as topsoil in agriculture. For this application it may be necessary to further grade the spadeable fill by size and content.

Figure 5:
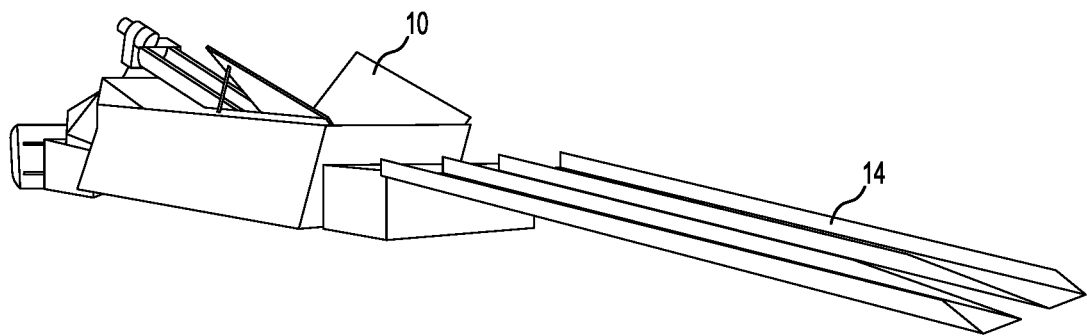
FIG. 5 is a side view of an embodiment of a spoil treatment plant.
Figure 6:
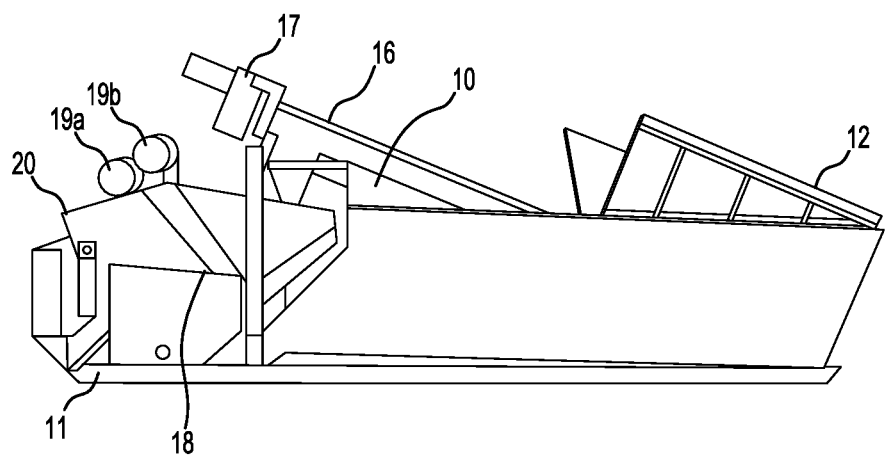
FIG. 6 is a close up view of the spoil treatment plant of FIG. 5.
Figure 7:
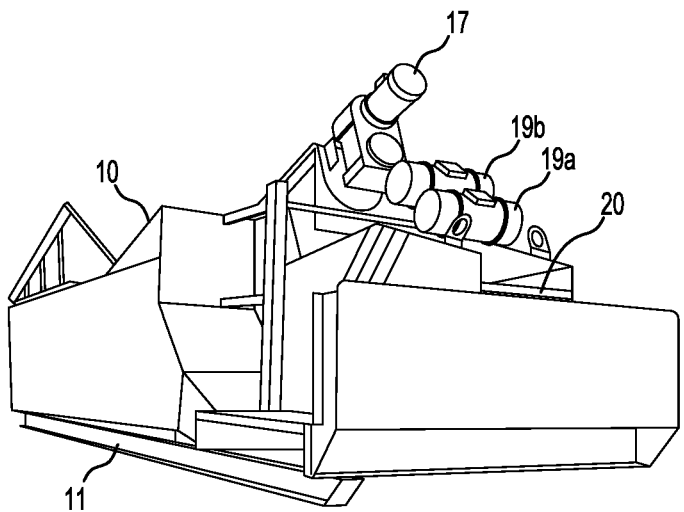
FIG. 7 is a rear view of the spoil treatment plant of FIG. 5.

Various aspects of one embodiment of a spoil treatment plant 10 are shown in FIG. 5, FIG. 6 and FIG. 7. The nature of the ramps 14 are shown clearly in FIG. 5. Although it is most likely that the vacuum excavation trucks will dump spoil directly into the dump bin 12 of the spoil treatment plant 10, it is also possible for the spoil to be dumped into an intermediate holding pond. The intermediate holding pond may be considered a buffer to provide a steady feed of spoil to the spoil treatment plant 10 and to minimize the amount of time the vacuum excavation trucks spend away from the hydro-excavation site.

The structure and location of the vibrating screen separator 18 is shown most clearly in FIG. 6. The vibrating screen separator 18 is positioned beneath the output of the screw elevator 16 and at the end of the frame 11. The spoil from the excavation trucks is dumped into the dump bin 12 at one end of the spoil treatment plant 10 and exits as spadeable fill from the chute 20 at the other end. A fine slurry containing most of the water from the spoil is collected in the slurry tank 22 located within the frame 11 but which is not visible in FIG. 6.

The location of the chute 20 is seen more clearly in FIG. 7. In this case the spoil treatment plant 10 is located on a raised section of ground so the spadeable fill from the chute 20 drops over the edge of the raised ground. Periodically a mini-loader (or similar) clears the spadeable fill for other use, as mentioned above.

Figure 8:
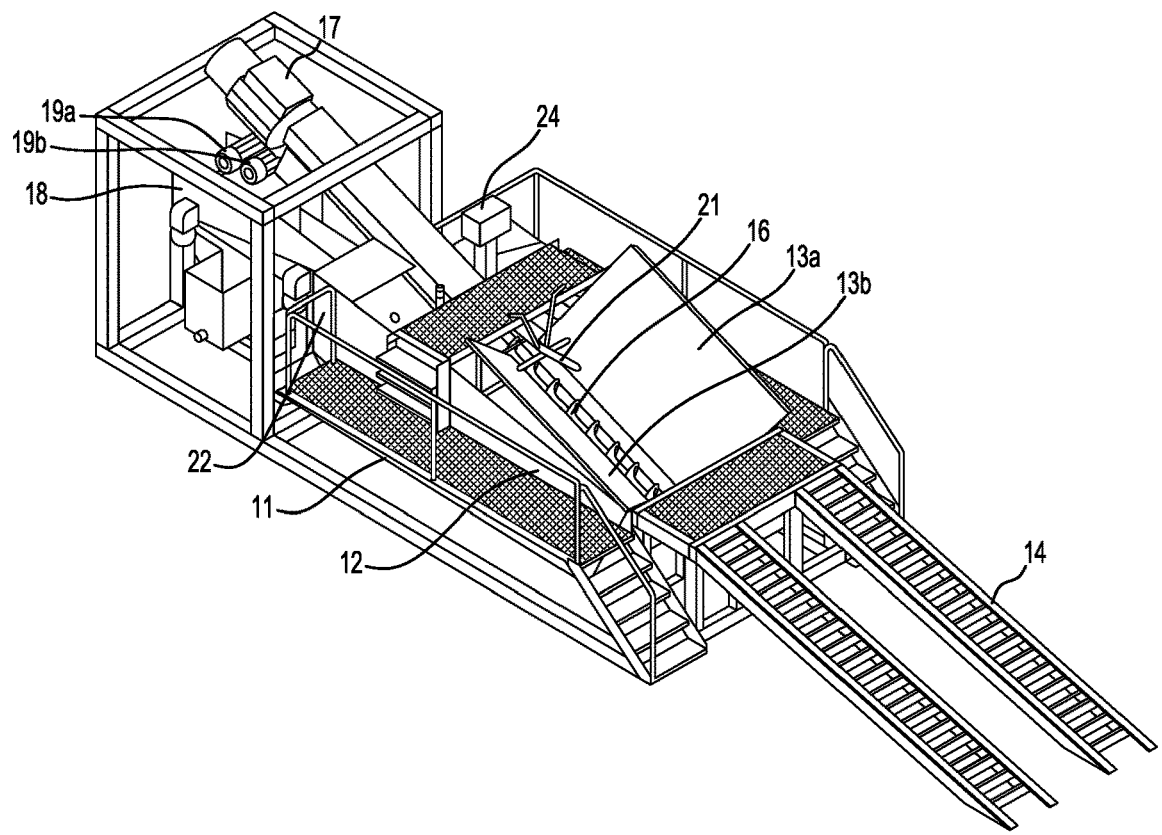
FIG. 8 is a sketch of a further embodiment of a spoil treatment plant.

A further embodiment of a spoil treatment plant is shown in FIG. 8. As with FIG. 1, the spoil treatment plant is constructed on a frame 11. Ramps 14 allow a vacuum excavation truck to dump spoil into a dump bin 12. Material from the dump bin 12 is conveyed to the vibrating screen separator 18 by a screw elevator 16. The screw elevator 16 is driven by motor 17 and the vibrating screen separator 18 is driven by motors 19a, 19b. The operation of the motors is controlled from control box 24.

The embodiment of FIG. 8 differs from the embodiment of FIG. 1 by the provision of wings 13a, 13b. The wings 13a, 13b are extensions from the dump bin 12 and form a weir so that excess fluid dumped from the vacuum excavation truck can spill into the slurry tank 22. The formation of a weir assists with the rate of processing of spoil dumped in the dump bin 12 since the screw elevator 16 only lifts spoil that requires processing, and not extra water. The wings 13a, 13b also assist to capture the spoil dumped from the vacuum excavation truck and direct it to the screw elevator 16.

Figure 9:
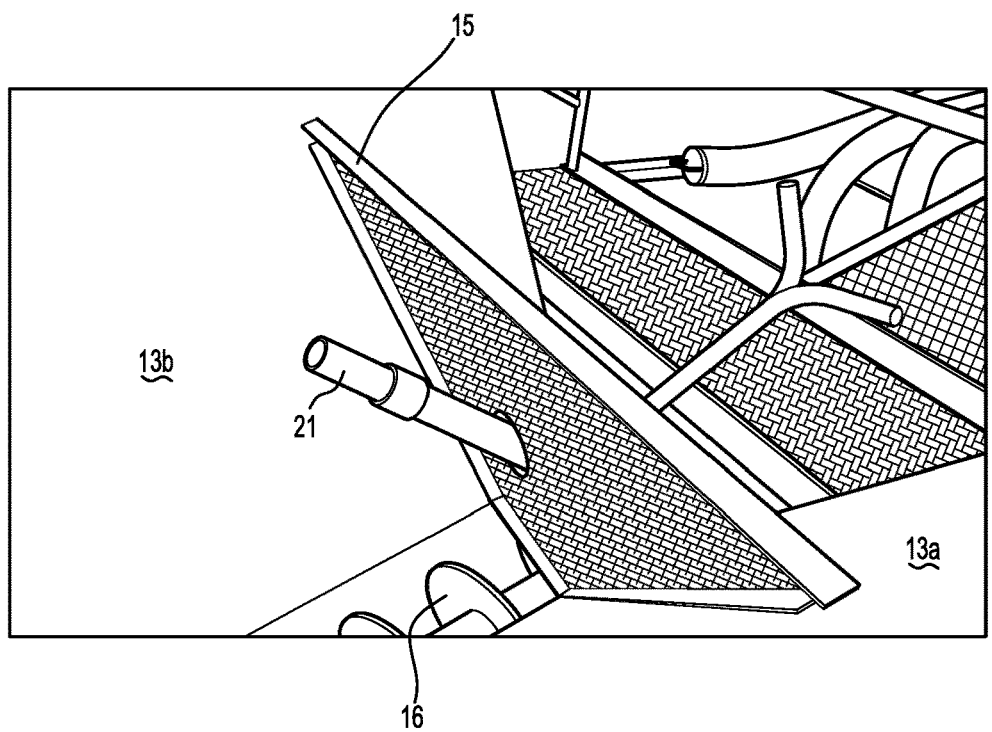
FIG. 9 is an enlarged view of a portion of the embodiment of FIG. 8 with the addition of a course screen.

The action of the weir may be further enhanced by the addition of a course screen 15, as shown in FIG. 9. The course screen 15 prevents large diameter material from the spoil spilling into the slurry tank 22.

Water from the slurry tank 22 may be used to wash spoil from the vacuum excavation truck using nozzle 21. Nozzle 21 is optionally positioned to direct a jet of water into the vacuum excavation truck while it is dumping spoil into the dump bin 12. The water may be pumped from the slurry tank 22 to the nozzle 21 using any suitable pump.

Figure 10:
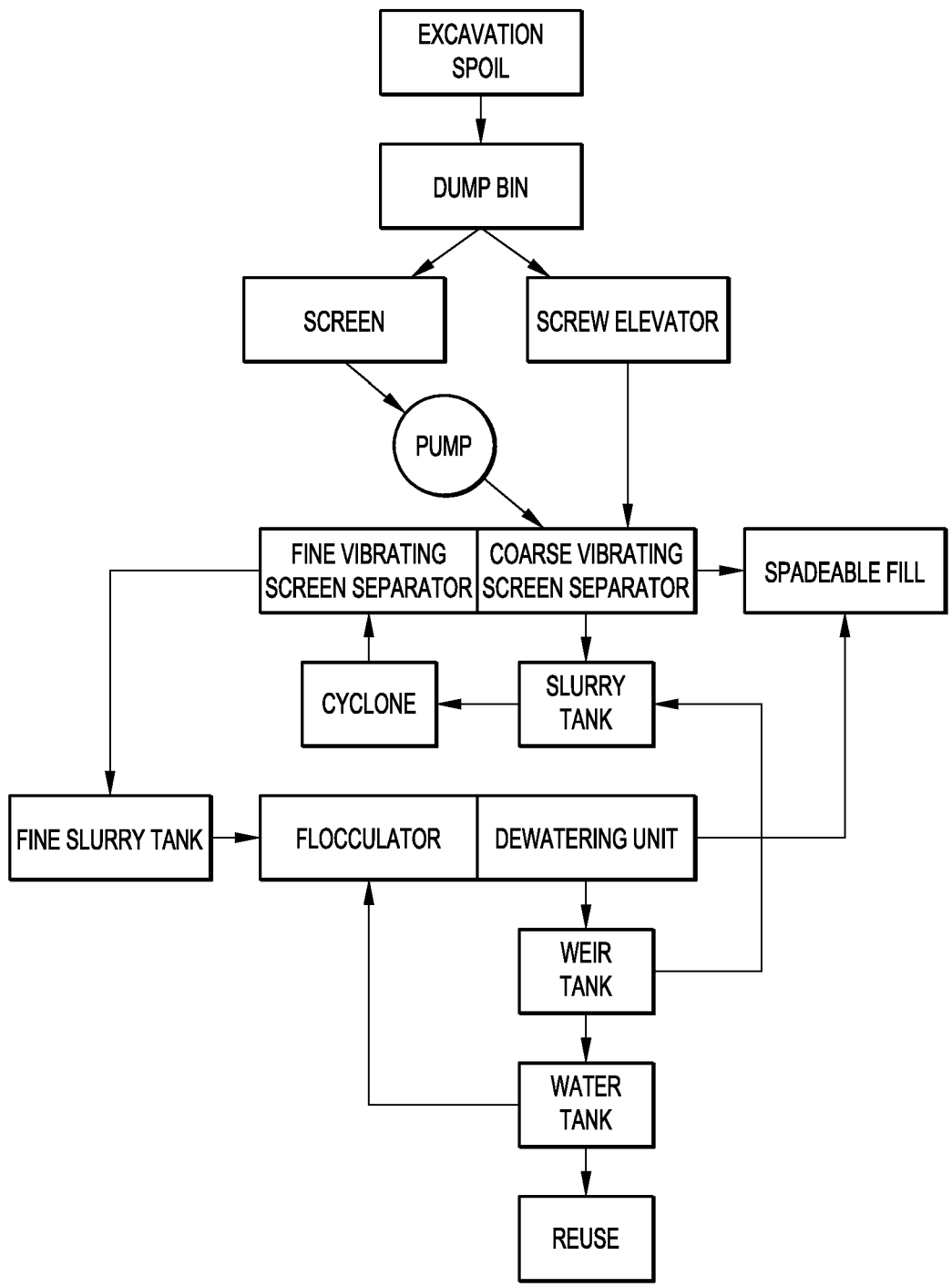
FIG. 10 is a flowchart of another embodiment of a spoil treatment process similar to FIG. 1 but with additional dewatering.

Referring to FIG. 10 there is a shown a flowchart of a further spoil treatment process that includes additional dewatering. As with the process of FIG. 1, spoil from an excavation site is dumped into a dump bin of the plant. A screen in the back of the dump bin allows relatively coarse slurry to pool in the dump bin away from the start of the screw elevator. The screen may have a maximum aperture diameter of around 6 mm. The relatively coarse slurry is pumped to the vibrating screen separator as required to manage appropriate water content for efficient operation.

In parallel, a screw elevator moves the spoil from the dump bin to the vibrating screen separator. The vibrating screen separator has two separate compartments that are driven by the same motors in the manner described above. One compartment separates using a higher water content than the other compartment and therefore the inventors have found it useful to divide the vibrating screen separator into two compartments so that different water contents can be achieved. The output from the coarse vibrating screen separator is spadeable fill and fine slurry that drops to a slurry tank beneath the vibrating screen separator.

The fine slurry may be pumped from the slurry tank through a hydrocyclone to remove ultrafine particles, such as sand, and then directed to the fine vibrating screen compartment. Material and water that passes through the fine vibrating screen compartment is captured in a fine slurry tank and further processed as described below. Material that does not pass through the fine vibrating screen compartment is directed again through the coarse vibrating screen compartment or directly to the spadeable fill.

This arrangement also allows for the option of using a different mesh in each compartment of the vibrating screen separator. The dryer compartment may have a coarser mesh with maximum diameter apertures around 1 mm or greater that passes water and fine soil particles, which together form the fine slurry. The other compartment may have a finer mesh with maximum aperture less than 1 mm that passes water with finer particles that goes to the fine slurry tank.

The output from the fine slurry tank is further dewatered in, for example, a dewatering unit. The dewatering unit may be a rotary press, a belt press, a screw press, a filter press, a fold press, a centrifuge or other similar device. By way of example a rotary press extracts water by pressing sludge between two rotating screens, a suitable rotary press is produced by Fournier Industries Inc of Quebec, Canada. A screw press extracts water using a rotating screw within a filter basket; a filter press operates by using pressure to force sludge through filter plates; a fold press dewaters sludge by pressing it in a folded belt; and a centrifuge extracts water using centrifugal force.

A flocculator may optionally be associated with the dewatering unit to further enhance the dewatering process. One output from the dewatering unit is a relatively dry mass that can be used as spadeable fill. Another output from the dewatering unit is relatively clean water which is captured in a weir tank for reuse. The weir tank allows for settling of any carry over flock if the flocculator is used. The carry over flock is directed back to the slurry tank for further processing. The clean water is drained to a water tank from whence it can be used in the flocculator or other uses as discussed above.

Figure 11:
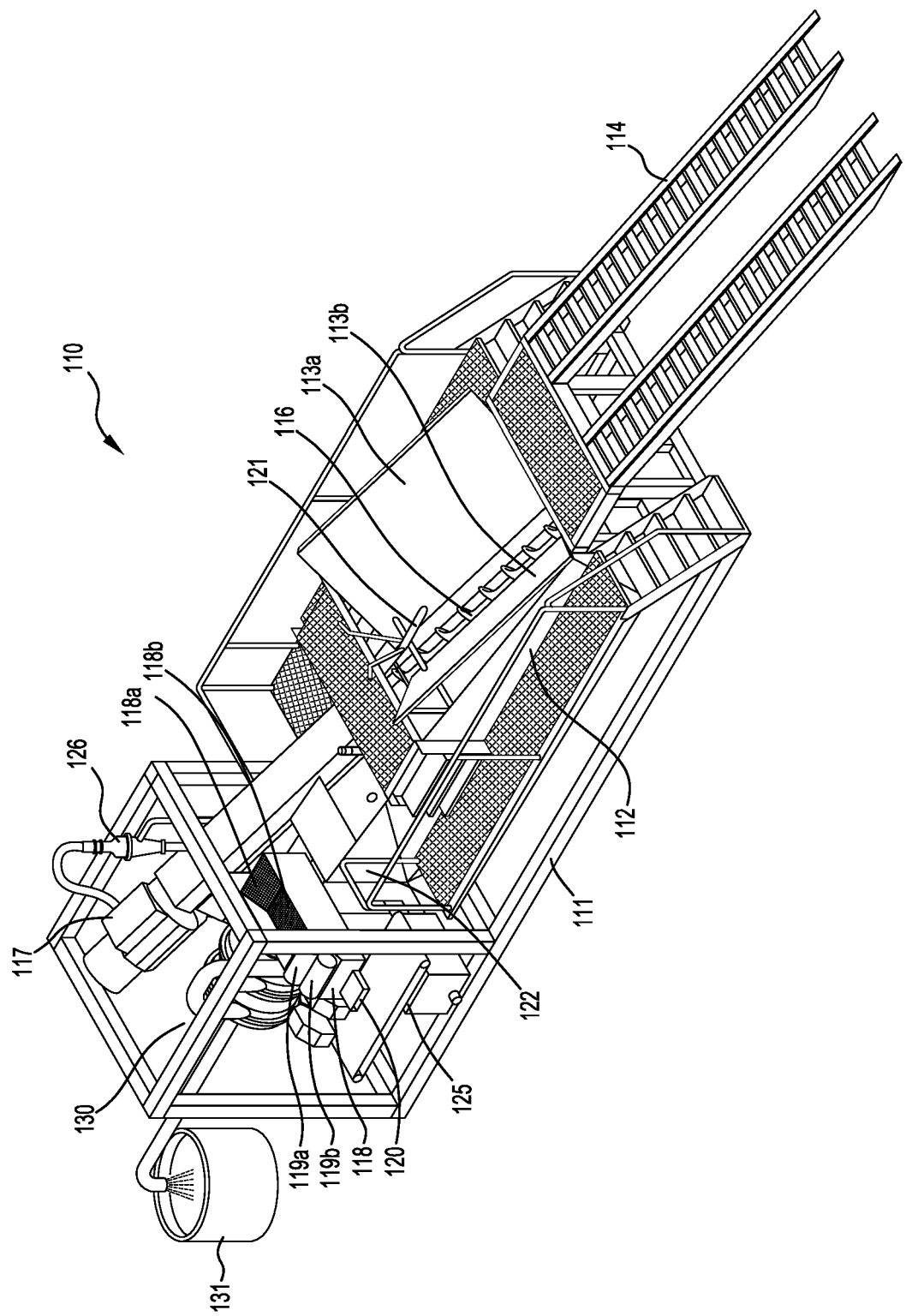
FIG. 11 is a sketch of the major components of a spoil treatment plant suitable for working the process of FIG. 10.

One embodiment of the major components of a spoil treatment plant for working the process of FIG. 10 is shown in FIG. 11. As with FIG. 1, the spoil treatment plant 110 is constructed on a frame 111. Ramps 114 allow a vacuum excavation truck to dump spoil into a dump bin 112. Material from the dump bin 112 is conveyed to the vibrating screen separator 118 by a screw elevator 116. The screw elevator 116 is driven by motor 117 and the vibrating screen separator 118 is driven by motors 119a, 119b.

As with the embodiment of FIG. 8 the wings 113a, 113b are extensions from the dump bin 112 and form a weir. Unlike the embodiment of FIG. 8, the excess fluid does not spill directly into slurry tank 122 but instead is captured in a partitioned section of the dump bin (not visible). A pump (not visible) lifts the excess fluid (which includes particles) to the vibrating screen separator 118 as required for efficient operation.

Compared to the embodiment of FIG. 8, the vibrating screen separator 118 is rotated ninety degrees so that the chute 120 is directed to the side of the spoil treatment plant 110. The vibrating screen separator 118 is divided into two compartments 118a and 118b. Compartment 118a operates much as described previously with the chute 120 issuing onto a conveyor 125. The conveyor 125 operates to carry the spadeable fill that issues from the chute 120 to the rear of the spoil treatment plant 110. Water and particles that pass through the vibrating screen separator 118 in compartment 118a drop to a slurry tank 122 below the vibrating screen separator 118. Slurry from slurry tank 122 is pumped to a hydrocyclone 126 which removes very fine particles, such as sand, and delivers the remaining slurry into compartment 118b of the vibrating screen separator 118.

The second compartment 118b operates at a higher water content than first compartment 118a. The output goes to the same chute 120 that extends across both compartments. The fine slurry that passes through the vibrating screen separator 118 from the second compartment 118b goes to a fine slurry tank and is pumped to the dewatering unit 130. As shown in FIG. 11, the dewatering unit 130 is positioned close to the vibrating screen separator 118 so that the equipment is held fully within the frame for easy transportation, as described above. Dry spadeable fill issues from the dewatering unit 130 and drops onto the conveyor 125. Water from the dewatering unit 130 is piped to a water tank 131 for reuse. The water tank 131 will not usually be contained within the frame of the spoil treatment plant 110.

The spoil treatment plant offers significant benefits in the hydro-excavation industry. Positioning a spoil treatment plant at or near a hydro-excavation project reduces off site travel for disposal and provides a significant increase in productivity. The larger and more congested the road network the greater the productivity gains.

Typically in large cities a hydro-excavation unit will frequently achieve at best two loads. This equates to four (4) productive hours in a twelve (12) hour paid shift. Clients are paying for windscreen time and not productivity. The spoil treatment plant doubles the productivity to eight hours. Other advantages include:

Reduced onsite congestion as only half the hydro-excavation units will be required;

Reduction in truck traffic on road system;

Reduced fuel consumption and greenhouse gas generation;

Improved productivity and utilisation of contractor's workforce and equipment as hydro-excavation units remain on site;

Permits increased number of smaller trucks resulting in quicker work completion at a lower cost;

Disposal of spadeable fill will be at a lower cost;

If transport of spadeable fill to an offsite location is required it can be done in bulk and "out of hours" at greatly reduced cost;

When spadeable fill can be re-used (after testing) it is no longer in the waste stream and as such is not subject to Government waste levies;

Smaller trucks utilising smaller auxiliary engines are travelling fewer kilometres which equates to large savings in fuel, tyres and maintenance;

Great sustainability and a zero waste strategy adding to significant green credentials;

Allows for a reconfigurable network of spoil transport plants (perhaps 5 to 10 in a region) that may be positioned semi-permanently while a number of jobs are undertaken within an area of perhaps a 50 km to 100 km radius.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A spoil treatment plant for dewatering spoil comprising:

an open rectangular frame;

a dump bin held within the open rectangular frame for receiving spoil;

a vibrating screen separator mounted within the open rectangular frame spaced from the dump bin;

a screw elevator located within the open rectangular frame, the screw elevator transporting spoil from the dump bin to the vibrating screen separator;

a slurry tank within the open rectangular frame below the vibrating screen separator that collects fine slurry; and a chute adjacent the vibrating screen separator for delivering spadeable fill; wherein the vibrating screen separator separates the spoil into spadeable fill delivered from the chute and fine slurry delivered to the slurry tank.

2. The spoil treatment plant of claim 1 wherein the open rectangular frame is of a size and shape capable of being relocated by transport on the back of a truck.

3. The spoil treatment plant of claim 1 wherein the open rectangular frame includes lifting or dragging points capable of lifting the plant onto a truck without disassembly.

4. The spoil treatment plant of claim 1 further comprising ramps for positioning a truck to dump spoil into the dump bin.

5. The spoil treatment plant of claim 4 wherein the ramps are of a size and shape capable of being stored within the open rectangular frame during relocation of the plant.

6. The spoil treatment plant of claim 1 wherein the dump bin comprises extended side walls that form a weir.

7. The spoil treatment plant of claim 1 wherein the vibrating screen separator is driven by two motors acting to move a screen in opposite directions.

8. The spoil treatment plant of claim 1 further comprising a control box with controls to control the vibrating screen separator and the screw elevator.

9. The spoil treatment plant of claim 1 wherein the vibrating screen separator comprises a screen with apertures having a largest dimension of about 1 mm.

10. The spoil treatment plant of claim 1 wherein the vibrating screen separator comprises a screen with apertures that have an inverted cone profile.

11. The spoil treatment plant of claim 1 wherein the vibrating screen separator comprises two or more adjacent compartments.

12. The spoil treatment plant of claim 1 further comprising a settling tank for the slurry to separate into particulate matter and water by settling.

13. The spoil treatment plant of claim 1 further comprising dewatering elements for removing water from the fine slurry selected from: a rotary press; a screw press; a belt press; a filter press; a fold press; a centrifuge, and a hydrocyclone.

* * * * *